Oct. 22, 1940.  O. KELLNER  2,218,884

FILTER HOLDING BOX

Filed Jan. 18, 1938

Inventor:
Oskar Kellner
By [signature]
Atty.

Patented Oct. 22, 1940

2,218,884

UNITED STATES PATENT OFFICE 2,218,884

FILTER HOLDING BOX

Oskar Kellner, Augsburg, Germany

Application January 18, 1938, Serial No. 185,490
In Germany January 18, 1937

2 Claims. (Cl. 88—1)

In order to shield the photographic lens during exposure from light which may strike it at an unsuitable angle as, for instance, obliquely from the top or the side, a so-called sunblind which may be ring-shaped or of any other convenient shape is attached to the lens body. Sunblinds of the type referred to are relatively expensive and, moreover, they constitute another part or accessory which the photographer must contend with along with other numerous accessories. The object of the present invention is to save the expense and the inconvenience of such special appurtenances by adapting to this purpose one already provided for other uses, such as the box for holding the optical filter or filters or the like, in such manner that the box may either itself be used as a sunblind, or hold in addition to the filters and apart therefrom a special sunblind.

Boxes for holding a single filter or a number of filters are known which consist of a usually ring shaped bottom part and a cover or cap fitted thereto.

The filter holding box according to this invention has in addition to the preferably ring-shaped bottom part and the cap an intermediate body member which by means of a ring of suitable size and dimensions slipped from the back into the same, may be attached to the lens body, thus converting the intermediate member into a sunblind.

The annexed drawing shows, by way of example, preferred forms of the filter holding box according to this invention, partly in cross section and partly as side views. In said drawing Fig. 1 shows the cover or cap of the film holding box;

Figure 1:
Figure 2:
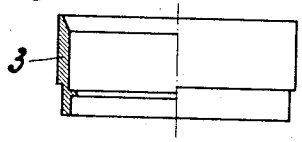
Fig. 2 shows the intermediate member, adaptable for use as a sunblind.
Figure 3:
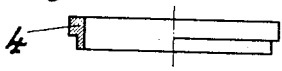
Fig. 3 shows an intermediary ring.
Figure 4:
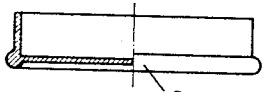
Fig. 4 shows the bottom part of the box.
Figure 5:
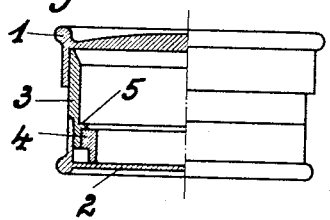
Fig. 5 shows the above parts, as assembled.

The cover 1, the intermediate member 3, the ring 4, and the bottom part 2 are to be assembled as shown in Fig. 5. The ring 4 is pushed from the back into the intermediate member or sleeve 3, the inside diameter of which, in front of the ledge 5, is about equal to that of the filter resting thereon. The inside diameter of the ring 4 is equal to the outside diameter of the lens body.

Figure 6:
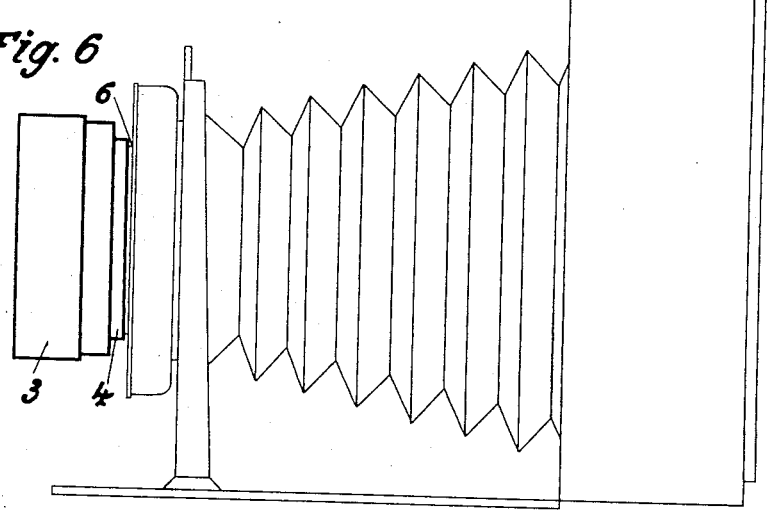
Fig. 6 shows the sunblind attached to the lens of a photographic camera.

The intermediate member is deep enough to serve as a sunblind. If it is desired to use it as such, the members 3 and 4 only are assembled and the ring 4 is then pushed upon the body of the lens, as shown in Fig. 6, the cover 1 and the bottom 2 of the box having been laid aside The great depth of the intermediate member 3 shields the lens effectively from the light rays which otherwise might strike it obliquely from the top or the sides. The members 3 and 4 can, of course also be made in one piece. This would however limit its use considerably, since then it could be used only with a lens of a certain given outside diameter, whereas otherwise a number of exchangeable rings 4 of various inside diameters can be used to suit lenses of various outside diameters. If the box is to be used simply as a receptacle for a filter, the cover 1 is, of course, placed directly upon the bottom part 2 of the box.

It is by no means strictly necessary that the various parts of the box be ring-shaped, circular or cylindrical; they may within the scope of the invention also be angular. Agreeably to the purpose, their shapes will accord with those of the filters and sunblinds for holding which they are designed.

I claim:

1. As an article of manufacture, a photographic accessory comprising a combined filter box and sun blind in the form of a container for holding optical filters and having a portion adapted for use as a sun-blind, said box containing a bottom part having a flange, a cover also having a flange, an intermediate annular sleeve open at both ends adapted to have the flanges of the bottom and cover detachably applied to the respective ends of the sleeve, said sleeve having an interior ledge, and a ring fitted within the said sleeve and against the ledge, said ring being of an internal diameter to telescopically fit over the lens body whereby when the bottom and cover are detached from the sleeve, the sleeve and ring may be used as a sun-blind for the lens.

2. As an article of manufacture, a photographic accessory for use as a sun-blind and having the form of an annular sleeve provided with an interior ledge and a ring detachably fitted in the end of the sleeve and abutting said ledge, the interior diameter of the ring being such as to fit over a lens frame, and flanged bottom and cover members adapted to fit over the open ends of the sleeve when not in use as a sun blind to form a closed container.

OSKAR KELLNER.